(12) United States Patent
Ishii et al.

(10) Patent No.: US 9,261,020 B2
(45) Date of Patent: Feb. 16, 2016

(54) INTEGRATED COAL GASIFICATION COMBINED CYCLE PLANT

(75) Inventors: Hiromi Ishii, Tokyo (JP); Yuichiro Kitagawa, Tokyo (JP); Yasunari Shibata, Tokyo (JP); Yuichiro Urakata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 791 days.

(21) Appl. No.: 13/515,393

(22) PCT Filed: Mar. 29, 2011

(86) PCT No.: PCT/JP2011/057738
§ 371 (c)(1),
(2), (4) Date: Jun. 12, 2012

(87) PCT Pub. No.: WO2011/122594
PCT Pub. Date: Oct. 6, 2011

(65) Prior Publication Data
US 2012/0247080 A1 Oct. 4, 2012

(30) Foreign Application Priority Data

Mar. 29, 2010 (JP) ................................ 2010-074618

(51) Int. Cl.
*F02C 3/28* (2006.01)
*F01K 23/06* (2006.01)
(Continued)

(52) U.S. Cl.
CPC . *F02C 3/28* (2013.01); *C10J 3/485* (2013.01); *C10J 3/506* (2013.01); *C10K 1/005* (2013.01);
(Continued)

(58) Field of Classification Search
CPC ................ F02C 3/28; F02C 6/04; F02C 6/18; F01K 23/10; F01K 3/06; Y02E 20/18; Y02E 20/185
USPC ........... 60/39.182, 780, 781, 39.52, 39.5, 784
See application file for complete search history.

(56) References Cited

U.S. PATENT DOCUMENTS 3,703,807 A * 11/1972 Rice ........................... 60/39.182
4,164,124 A * 8/1979 Taylor et al. .................... 60/683
(Continued)

FOREIGN PATENT DOCUMENTS

EP 0 444 987 A1 9/1991
EP 2 251 598 A1 11/2010
(Continued)

OTHER PUBLICATIONS

Decision of Patent Grant issued Jun. 10, 2014 in corresponding Japanese Application No. 2010-074618 (with English translation).
(Continued)

*Primary Examiner* — Steven Sutherland
(74) *Attorney, Agent, or Firm* — Wenderoth, Lind & Ponack, L.L.P.

(57) ABSTRACT

Synthesis gas (syngas) gasified in a gasification furnace to which coal is introduced burns in a combustor. An exhaust-heat recovery boiler generates steam by using exhaust gas let out from a gas turbine equipped with the combustor. The steam generated in the exhaust-heat recovery boiler is introduced to a steam turbine. A generator is driven by the steam turbine and the gas turbine to generate electrical power. Part of the exhaust gas let out from the gas turbine is introduced to a carbon-dioxide recovery unit, where carbon dioxide is recovered therefrom. Coal is carried to the gasification furnace by the carbon dioxide.

2 Claims, 3 Drawing Sheets

(51) Int. Cl.
*C10J 3/48* (2006.01)
*C10J 3/50* (2006.01)
*C10K 1/00* (2006.01)
*C10K 1/02* (2006.01)
*C10K 3/04* (2006.01)

(52) U.S. Cl.
CPC .............. C10K 1/024 (2013.01); F01K 23/067 (2013.01); *C10J 2300/093* (2013.01); *C10J 2300/094* (2013.01); *C10J 2300/0969* (2013.01); *C10J 2300/1612* (2013.01); *C10J 2300/1618* (2013.01); *C10J 2300/1653* (2013.01); *C10K 3/04* (2013.01); *F05D 2220/72* (2013.01); *Y02E 20/16* (2013.01); *Y02E 20/18* (2013.01); *Y02E 20/185* (2013.01)

(56) References Cited

U.S. PATENT DOCUMENTS

| | | | |
|---|---|---|---|
| 5,265,410 | A | 11/1993 | Hisatome |
| 5,456,066 | A * | 10/1995 | Smith et al. ............... 60/775 |
| 2008/0245076 | A1 * | 10/2008 | Martin et al. .............. 60/781 |
| 2009/0025390 | A1 | 1/2009 | Christensen et al. |
| 2011/0139047 | A1 | 6/2011 | Takase et al. |

FOREIGN PATENT DOCUMENTS

| | | |
|---|---|---|
| JP | 3-237222 | 10/1991 |
| JP | 4-1428 | 1/1992 |
| JP | 4-116232 | 4/1992 |
| JP | 9-228807 | 9/1997 |
| JP | 9-257236 | 9/1997 |
| JP | 2000-27659 | 1/2000 |
| JP | 2000-109859 | 4/2000 |
| JP | 2001-49268 | 2/2001 |
| JP | 2002-285175 | 10/2002 |
| JP | 2008-534862 | 8/2008 |
| JP | 2010-59940 | 3/2010 |
| WO | 2009/110034 | 9/2009 |

OTHER PUBLICATIONS

Notification of Reasons for Rejection issued Nov. 12, 2013 in corresponding Japanese Application No. 2010-074618 (with English translation).

Notice of Allowance issued Dec. 24, 2014 in corresponding Chinese Application No. 201180005164.8.

International Search Report and Written Opinion of the International Search Authority issued Apr. 26, 2011 in corresponding International Application No. PCT/JP2011/057738.

* cited by examiner

INTEGRATED COAL GASIFICATION COMBINED CYCLE PLANT

BACKGROUND OF THE INVENTION

1. Technical Field

The present invention relates to an integrated coal gasification combined cycle plant, in particular, of the dry-coal-fed air-blown type.

2. Description of the Related Art

In general, a dry-coal-fed air-blown integrated coal gasification combined cycle plant is configured such that coal is supplied from a raw coal bunker to a coal pulverizer, where the coal is pulverized. The coal which has been pulverized (hereinafter referred to as "pulverized coal") is collected by a pulverized-coal collector and is supplied to a gasification furnace via a pulverized-coal bin and a pulverized-coal hopper.

When pulverized coal is to be supplied from the pulverized-coal hopper to the gasification furnace, the pulverized coal is carried to the gasification furnace using nitrogen gas, which is inert gas separated from air by an air separation unit. Oxygen separated from air by the air separation unit is introduced to the gasification furnace, where the pulverized coal carried by the nitrogen gas is burned. The pulverized coal is partly burned and decomposed by heat in the gasification furnace and is thereafter gasified into raw syngas.

Char contained in the raw syngas which is produced is separated from the syngas through a filter. The char separated by the filter is recovered into the gasification furnace and is burned together with the pulverized coal. At that time, the char is carried to the gasification furnace by the nitrogen gas generated by the air separation unit. The filter that separates the char is prevented from clogging by backwashing using the nitrogen gas generated by the air separation unit.

The syngas that has passed through the filter is introduced to a gas turbine as fuel gas after sulfur compounds, nitrogen compounds and so on contained therein are removed by a gas purification system. The fuel gas introduced to the gas turbine is burned in a combustor of the gas turbine together with air to become exhaust gas.

The exhaust gas is exhausted from the combustor to rotationally drive the turbine of the gas turbine. Since the turbine is rotationally driven, a compressor provided coaxially therewith is rotationally driven to compress air. Electrical power is generated by a generator connected to an end of the rotating shaft. The air that the compressor has compressed is supplied to the combustor of the gas turbine and the gasification furnace.

The exhaust gas that has rotationally driven the turbine is introduced to an exhaust-heat recovery boiler. The exhaust gas introduced to the exhaust-heat recovery boiler vaporizes water introduced to the exhaust-heat recovery boiler depending on the amount of heat in the exhaust gas. The steam generated in the exhaust-heat recovery boiler rotationally drives a steam turbine mounted on the rotating shaft of the gas turbine. The rotating shaft connected to the steam turbine is further driven by rotational driving of the steam turbine. Thus, the generator is driven by the gas turbine and the steam turbine to achieve combined-cycle power generation, thus improving the power generation efficiency.

On the other hand, the exhaust gas that has given up its heat to the feed water in the exhaust-heat recovery boiler is exhausted outside the integrated coal gasification combined cycle plant through a chimney.

Moreover, part of the exhaust gas let out from the gas turbine is introduced to the coal pulverizer. The exhaust gas introduced to the coal pulverizer, because it is dry and has a large quantity of heat, is used to dry the coal supplied from the raw coal bunker.

The use of carbon dioxide exhausted from the foregoing integrated coal gasification combined cycle plant, as described above, is disclosed in Japanese Unexamined Patent Application, Publication No. Hei 4-1428, in which exhaust gas let out from a gas turbine is recovered and is circulated in a combustor of the gas turbine and a compressor.

SUMMARY OF THE INVENTION

1. Technical Problem

However, the invention described in JP 4-1428 needs to provide an air separation unit that generates inert gas that carries pulverized coal and char to a gasification furnace and inert gas for use in backwashing a filter. However, this causes a problem in that large power consumption is needed to operate the air separation unit, thus decreasing the efficiency of the entire plant. This also causes a problem in that plant facility costs are increased because the air separation unit is installed. Furthermore, this causes a problem in that the air separation unit has low reliability in continuous operation.

The present invention is made in consideration of such circumstances, and an object thereof is to provide an integrated coal gasification combined cycle plant in which plant installation costs can be reduced, and a decrease in plant efficiency can be prevented.

2. Solution to the Problem

An integrated coal gasification combined cycle plant of the present invention adopts the following solutions to solve the above problems.

An integrated coal gasification combined cycle plant according to the present invention includes a pulverizer that pulverizes coal; a gasification furnace to which coal that the pulverizer has pulverized is introduced; a gas turbine equipped with a combustor in which syngas gasified in the gasification furnace burns; an exhaust-heat recovery boiler that generates steam by using exhaust gas let out from the gas turbine; a steam turbine to which the steam generated in the exhaust-heat recovery boiler is introduced; a generator driven by the steam turbine and the gas turbine to generate electrical power; and a carbon-dioxide recovery unit to which part of the exhaust gas let out from the gas turbine is introduced and which recovers carbon dioxide therein, wherein coal and char hoppers are pressurized using the carbon dioxide, and the coal and char are carried to the gasification furnace using the carbon dioxide as carrier gas.

Conventionally, nitrogen gas, which is inert gas generated by an air separation unit, is used to carry the coal pulverized by the pulverizer to the gasification furnace. However, this causes a problem in that large power consumption is needed to operate the air separation unit, thus decreasing the efficiency of the integrated coal gasification combined cycle plant. This also causes a problem in that the integrated coal gasification combined cycle plant needs to have the air separation unit, which requires air separation unit installation costs, thus increasing the cost of the integrated coal gasification combined cycle plant. Furthermore, this causes a problem in that the air separation unit has low reliability in continuous operation.

The present invention is configured such that the carbon-dioxide recovery unit is provided to recover carbon dioxide in the exhaust gas let out from the gas turbine. The carbon dioxide recovered by the carbon-dioxide recovery unit is inert gas. Therefore, the recovered carbon dioxide can be used to carry coal to the gasification furnace. Therefore, this eliminates the need to provide an additional apparatus for generating inert gas, thus reducing the facility costs of the integrated coal gasification combined cycle plant 1 and preventing a decrease in the efficiency of the integrated coal gasification combined cycle plant.

In the integrated coal gasification combined cycle plant according to the present invention, preferably, the carbon-dioxide recovery unit is provided between the gasification furnace and the combustor.

The raw syngas produced by the coal gasification furnace contains carbon dioxide. Thus, providing the carbon-dioxide recovery unit between the gasification furnace and the combustor of the gas turbine allows the carbon dioxide in the raw syngas let out from the coal gasification furnace to be recovered by the carbon-dioxide recovery unit. Therefore, this eliminates the need to generate inert gas separately, thus reducing the facility costs of the integrated coal gasification combined cycle plant and preventing a decrease in the efficiency of the integrated coal gasification combined cycle plant.

In the foregoing integrated coal gasification combined cycle plant, preferably, a carbon-monoxide shift converter that converts carbon monoxide in the syngas to a predetermined amount of carbon dioxide is provided upstream of the carbon-dioxide recovery unit.

Carbon monoxide can be converted to carbon dioxide by reacting it with water vapor on a catalyst. Thus, providing the carbon-monoxide shift converter upstream of the carbon-dioxide recovery unit allows carbon dioxide to be generated with the carbon-monoxide shift converter and allows a predetermined amount of carbon dioxide to be supplied to the carbon-dioxide recovery unit even if the carbon dioxide in the raw syngas let out from the gasification furnace does not satisfy a predetermined amount. Therefore, this eliminates the need to generate inert gas separately, thus reducing the facility costs of the integrated coal gasification combined cycle plant and preventing a decrease in the efficiency of the integrated coal gasification combined cycle plant.

Although the predetermined amount of carbon dioxide normally corresponds to 10% of the syngas introduced to the carbon-dioxide recovery unit, the amount differs depending on the configuration of the coal and char carrying system.

Furthermore, when the carbon-dioxide recovery unit has recovered a predetermined amount or more of carbon dioxide necessary for carrying coal or char and for pressurizing the hopper thereof, the recovered carbon dioxide is introduced to a storage facility that stores it outside the plant (for example, in the ground), and thus, the amount of carbon dioxide discharged from the integrated coal gasification combined cycle plant directly to the atmosphere can be reduced.

Although the hopper that supplies coal or char is pressurized using inert gas (for example, carbon dioxide) to supply the coal or char to the gasification furnace, when it becomes empty after supplying the coal or char to the gasification furnace, the hopper needs to be depressurized and evacuated to receive the next amount of coal. At that time, the exhaust gas is generally released to the atmosphere.

Thus, the depressurization evacuation system that depressurizes and evacuates the interior of the hopper does not release the carbon dioxide to the atmosphere but stores the carbon dioxide in the storage facility provided outside the integrated coal gasification combined cycle plant. This can therefore reduce the amount of carbon dioxide released from the integrated coal gasification combined cycle plant to the atmosphere, thus preventing global warming.

Furthermore, in the integrated coal gasification combined cycle plant according to the present invention, preferably, the carbon-dioxide recovery unit is provided downstream of the exhaust-heat recovery boiler.

The exhaust gas let out from the gas turbine contains carbon dioxide, and the exhaust gas is introduced to the exhaust-heat recovery boiler. The carbon dioxide contained in the exhaust gas exhausted from the exhaust-heat recovery boiler is recovered by the carbon-dioxide recovery unit provided downstream of the exhaust-heat recovery boiler. Therefore, the carbon dioxide in the exhaust gas let out from the exhaust-heat recovery boiler can be recovered by the carbon-dioxide recovery unit.

Furthermore, regarding the carbon dioxide recovered by the carbon-dioxide recovery unit, when a predetermined amount or more of carbon dioxide necessary for carrying coal and char and for pressurizing the hoppers thereof is recovered, the recovered carbon dioxide is introduced to a storage facility that stores it outside the plant, and thus, the amount of carbon dioxide released from the integrated coal gasification combined cycle plant directly to the atmosphere can be reduced.

As in the above, the amount of carbon dioxide released from the integrated coal gasification combined cycle plant to the atmosphere can be reduced, thus preventing global warming.

3. Advantageous Effects of the Invention

Carbon dioxide in the exhaust gas let out from the gas turbine is recovered by providing the carbon-dioxide recovery unit. The carbon dioxide recovered by the carbon-dioxide recovery unit is inert gas. Therefore, the recovered carbon dioxide can be used to carry coal to the gasification furnace. Therefore, this eliminates the need to provide an additional apparatus for generating inert gas, thus reducing the facility costs of the integrated coal gasification combined cycle plant and preventing a decrease in the efficiency of the integrated coal gasification combined cycle plant.

DETAILED DESCRIPTION OF THE INVENTION

First Embodiment

Figure 1:
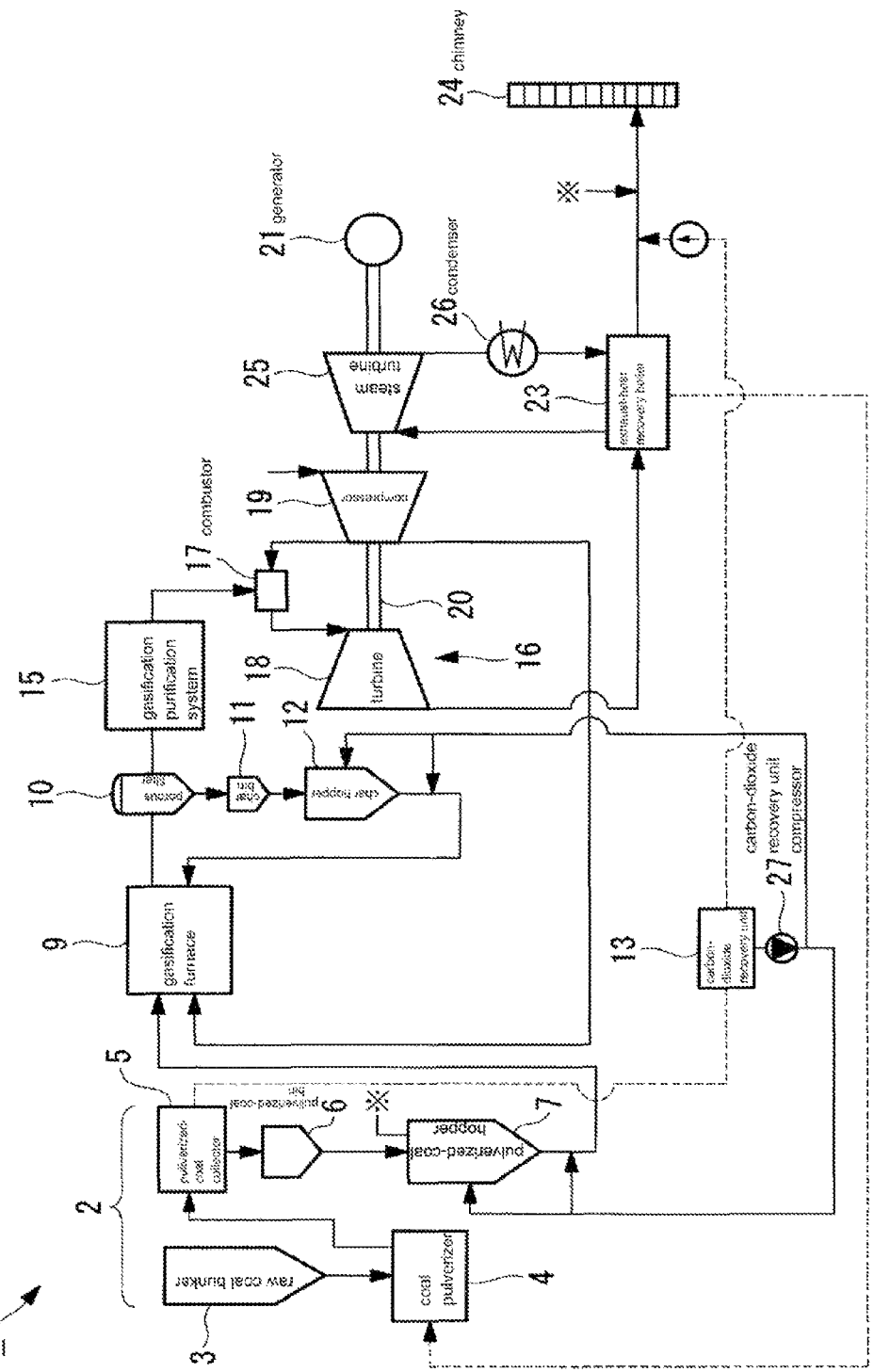
FIG. 1 is a schematic configuration diagram of an integrated coal gasification combined cycle plant according to a first embodiment of the present invention.

FIG. 1 shows a schematic configuration diagram of an integrated coal gasification combined cycle plant according to a first embodiment of the present invention.

As shown in FIG. 1, an integrated coal gasification combined cycle plant (IGCC: Integrated Coal Gasification Combined Cycle) 1 is mainly equipped with a coal supply facility 2, a coal gasification furnace (gasification furnace) 9 that gasifies coal supplied from the coal supply facility 2, a gas turbine 16 that is driven by burning syngas gasified by the coal gasification furnace 9, a steam turbine 25 to which steam that is generated using the heat of exhaust gas let out from the gas turbine 16 is introduced, a generator 21 driven by the gas turbine 16 and the steam turbine 25, and a carbon-dioxide recovery unit 13 to which part of the exhaust gas let out from the gas turbine 16 is introduced.

The coal supply facility 2 is provided upstream of the coal gasification furnace 9 and supplies pulverized coal to the coal gasification furnace 9.

The coal supply facility 2 is equipped with a raw coal bunker 3 in which raw coal is stocked, a coal pulverizer 4 that pulverizes the coal, a pulverized-coal collector 5 that collects dust in the pulverized coal pulverized by the coal pulverizer 4, and a pulverized-coal hopper 7 that stores the pulverized coal.

The coal introduced from the raw coal bunker 3 to the coal pulverizer 4 is pulverized into pulverized coal of a few μm to a few hundred μm by the coal pulverizer 4. The pulverized coal pulverized by the coal pulverizer 4 is collected by the pulverized-coal collector 5. The pulverized coal collected by the pulverized-coal collector 5 is introduced to the pulverized-coal hopper 7 through a pulverized-coal bin 6 that stores the pulverized coal.

The pulverized coal in the pulverized-coal hopper 7 is pressurized to a predetermined pressure by carbon dioxide gas supplied from a carbon-dioxide recovery unit 13, described later, and is thereafter carried to the coal gasification furnace 9 a fixed amount at a time. Here, the carbon dioxide gas is used as pulverized-coal carrier gas that carries the pulverized coal to the coal gasification furnace 9.

The interior of the pulverized-coal hopper 7 is under pressure because the carbon dioxide gas serving as pulverized-coal carrier gas is supplied thereto. However, if all the pulverized coal in the pulverized-coal hopper 7 is supplied to the coal gasification furnace 9, and thus the pulverized-coal hopper 7 becomes empty, the interior of the pulverized-coal hopper 7 needs to be depressurized and evacuated. Thus, by opening the valve of a depressurization evacuation system (not shown) connected to the emptied pulverized-coal hopper 7, the interior of the pulverized-coal hopper 7 is depressurized and evacuated. In the case of FIG. 1, the carbon dioxide, which is exhaust gas, is returned to the inlet of a chimney 24 and is released to the atmosphere.

The coal gasification furnace 9 is equipped with a coal gasification portion (not shown) formed so that the syngas which is produced is made to flow upwards from below and a heat exchange portion (not shown) which is connected downstream of the coal gasification portion and which is formed so that the syngas is made to flow downwards from above.

The coal gasification portion is provided with a combustor (not shown) and a reductor (not shown) from below. The combustor burns part of the pulverized coal and char. Although the combustor employs an entrained bed, it may employ a fluidized bed or a fixed bed.

The combustor and the reductor are provided with a combustor burner (not shown) and a reductor burner (not shown), respectively. These burners are supplied with pulverized coal from the pulverized-coal hopper 7.

The combustor burner is supplied with air that a compressor 19, described later, of the gas turbine 16 has compressed. That is, the integrated coal gasification combined cycle plant 1 of this embodiment is of the so-called air-blown type. Here, the air supplied from the compressor 19 of the gas turbine 16 is used as a gasifying agent.

The reductor gasifies the pulverized coal using high-temperature gas let out from the combustor. Thus, combustible syngas, such as carbon monoxide and hydrogen, is produced from the pulverized coal. The coal gasification reaction is an endothermic reaction in which carbon in the pulverized coal and char react with carbon dioxide and water content in the high-temperature gas to produce carbon monoxide and hydrogen.

The syngas produced in the reductor of the coal gasification furnace 9 is introduced to a porous filter 10. The porous filter 10 captures char entrained in the syngas when it passes therethrough. The char captured by the porous filter 10 is introduced to a char hopper 12 via a char bin 11 that stores the char.

The char collected in the char hopper 12 is returned to the combustor burner of the coal gasification furnace 9 together with the carbon dioxide gas supplied by the carbon-dioxide recovery unit 13 to be recycled.

The interior of the char hopper 12 is under pressure since the carbon dioxide gas serving as gas that returns the char to the coal gasification furnace 9 is supplied thereto. However, when all the char in the char hopper 12 is supplied to the coal gasification furnace 9, and thus the char hopper 12 becomes empty, the interior of the char hopper 12 needs to be depressurized and evacuated. Thus, by opening the valve of a depressurization evacuation system connected to the emptied char hopper 12, the interior of the char hopper 12 is depressurized and evacuated. Since the carbon dioxide, which is exhaust gas, is high-pressure gas, all of it is returned to syngas (not shown) and is not released to the atmosphere.

The raw syngas that has passed through the porous filter 10 contains sulfur compounds, such as hydrogen sulfide and carbonyl sulfide. Therefore, the raw syngas is introduced from the porous filter 10 to a gas purification system 15. The gas purification system 15 is equipped with a carbonyl sulfide converter (not shown), a hydrogen-sulfide absorption tower (not shown), and a hydrogen-sulfide combustion furnace (not shown).

The carbonyl sulfide converter converts the carbonyl sulfide in the introduced raw syngas to hydrogen sulfide by a catalytic reaction. The syngas that contains the hydrogen sulfide converted by the carbonyl sulfide converter is introduced to the hydrogen-sulfide absorption tower. The sulfur content of the hydrogen sulfide in the syngas introduced to the hydrogen-sulfide absorption tower is absorbed by a methyldiethanolamine (MDEA)-based absorbent. The syngas whose sulfur content is removed by being absorbed by the methyldiethanolamine-based absorbent is let out from the hydrogen-sulfide absorption tower as sweet syngas.

On the other hand, the sulfur content absorbed by the methyldiethanolamine-based absorbent is introduced to the hydrogen-sulfide combustion furnace, where it is burned and recovered as gypsum.

The sweet syngas let out from the hydrogen-sulfide absorption tower is introduced from the gas purification system 15 to the gas turbine 16. The sweet syngas introduced to the gas turbine 16 is fed to a combustor 17 of the gas turbine 16. The gas turbine 16 is equipped with the combustor 17, a turbine 18 driven by exhaust gas produced by combustion in the combustor 17, and the compressor 19 that feeds out high-pressure air to the combustor 17.

The combustor 17 burns the introduced sweet syngas and air and discharges exhaust gas. The exhaust gas exhausted from the combustor 17 is introduced to the turbine 18. The exhaust gas introduced to the turbine 18 rotationally drives the turbine 18. Since the turbine 18 is driven by the exhaust gas, a rotating shaft 20 connected to the turbine 18 is rotated thereby.

The compressor 19 is connected on the rotating shaft 20 and is rotationally driven by the rotation of the rotating shaft 20 to compress air. The air compressed by the compressor 19 is introduced to the combustor 17 and the coal gasification furnace 9. The generator 21 is connected to the rotating shaft 20. Therefore, the generator 21 is driven by the rotation of the rotating shaft 20 to generate electrical power.

The exhaust gas that has rotationally driven the turbine 18 is introduced to an exhaust-heat recovery boiler 23. The exhaust-heat recovery boiler 23 generates steam due to the heat of the exhaust gas introduced from the turbine 18. The exhaust gas whose heat is recovered in the exhaust-heat recovery boiler 23 is exhausted outside the integrated coal gasification combined cycle plant 1 through the chimney 24.

Moreover, part of the exhaust gas that has rotationally driven the turbine 18 is introduced to the coal pulverizer 4. Since the exhaust gas let out from the turbine 18 is at a high temperature and is dry, it is used to dry the pulverized coal in the coal pulverizer 4.

The steam generated in the exhaust-heat recovery boiler 23 due to the high-temperature exhaust gas introduced from the turbine 18 is supplied to the steam turbine 25. The steam turbine 25 is connected to the same rotating shaft 20 as that of the gas turbine 18, which is what is called a single-shaft combined system. The present invention is not limited to the single-shaft combined system but may be of a separate-shaft combined system.

The rotating shaft 20 driven by the turbine 18 increases in driving force due to the steam turbine 25. Therefore, this increases the amount of electrical power generated by the generator 21 connected to the rotating shaft 20.

The steam that has rotationally driven the steam turbine 25 is introduced to a condenser 26. The steam that has rotationally driven the steam turbine 25 is cooled by the condenser 26 to be turned back into condensed water and is thereafter introduced to the exhaust-heat recovery boiler 23.

Next, the flow of the recovery and supply of the carbon dioxide will be described.

The high-temperature, dry exhaust gas let out from the turbine 18 of the gas turbine 16 is introduced to the coal pulverizer 4. The exhaust gas introduced to the coal pulverizer 4 dries the pulverized coal in the coal pulverizer 4. The exhaust gas introduced to the coal pulverizer 4 is introduced to the carbon-dioxide recovery unit 13 through the pulverized-coal collector 5.

Carbon dioxide in the exhaust gas introduced to the carbon-dioxide recovery unit 13 is recovered. The carbon dioxide recovered by the carbon-dioxide recovery unit 13 is increased in pressure by a carbon-dioxide recovery unit compressor 27. The carbon dioxide, which is increased in pressure by the carbon-dioxide recovery unit compressor 27, may be introduced to the pulverized-coal hopper 7, the char hopper 12, and the porous filter 10 (not shown).

The exhaust gas from which carbon dioxide is recovered by the carbon-dioxide recovery unit 13 is introduced to the chimney 24 together with the exhaust gas let out from the exhaust-heat recovery boiler 23.

The carbon dioxide introduced to the pulverized-coal hopper 7 is used as a pulverized-coal carrier gas that carries the pulverized coal to the coal gasification furnace 9.

The carbon dioxide introduced to the char hopper 12 is used as a char carrier gas that returns the char to the coal gasification furnace 9.

The carbon dioxide introduced to the porous filter 10 may be used as a backwash gas to prevent the porous filter 10 from clogging (not shown).

Since the carbon dioxide is inert gas, it can prevent ignition of the pulverized coal and char.

As described above, the integrated coal gasification combined cycle plant according to this embodiment has the following operational advantages.

Carbon dioxide in the exhaust gas let out from the gas turbine 16 is recovered by the carbon-dioxide recovery unit 13. Since the carbon dioxide recovered by the carbon-dioxide recovery unit 13 is inert gas, the carbon dioxide can be used to carry coal to the coal gasification furnace (gasification furnace) 9. Therefore, this eliminates the need to provide another apparatus for generating inert gas, thus reducing the facility costs of the integrated coal gasification combined cycle plant 1 and preventing a decrease in the efficiency of the integrated coal gasification combined cycle plant 1.

Furthermore, the exhaust gas introduced to the carbon-dioxide recovery unit 13 is necessary for drying the coal. However, since a fan (not shown) or the like is already installed, another new piece of equipment is not needed in addition to the carbon-dioxide recovery unit 13 for recovering the carbon dioxide. This can minimize increases in the facility costs and the motive force.

Second Embodiment

A second embodiment of the present invention will be described hereinbelow. An integrated coal gasification combined cycle plant of this embodiment differs from the first embodiment in that the carbon-dioxide recovery unit is provided between the gas purification system and the combustor and that a carbon-monoxide shift converter is provided upstream of the carbon-dioxide recovery unit; the other features are the same. Accordingly, the same configurations and the flow of the recovery and supply of carbon dioxide are given the same reference signs, and descriptions thereof will be omitted.

Figure 2:
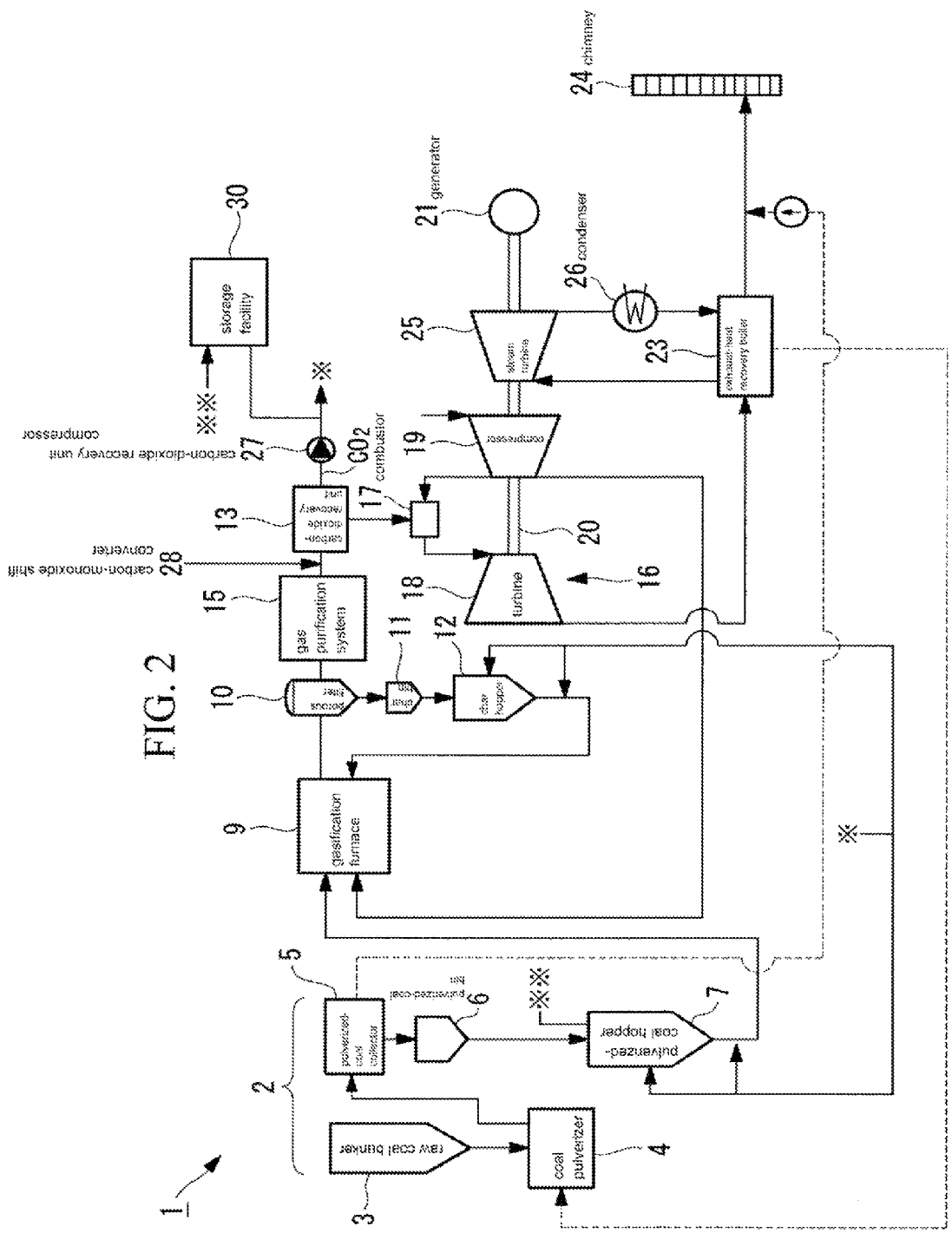
FIG. 2 is a schematic configuration diagram of an integrated coal gasification combined cycle plant according to a second embodiment of the present invention.

FIG. 2 shows a schematic configuration diagram of the integrated coal gasification combined cycle plant according to the second embodiment of the present invention.

The carbon-dioxide recovery unit 13 is provided between the gas purification system 15 and the gas turbine 16. A carbon-monoxide shift converter 28 that converts carbon monoxide to carbon dioxide is provided between the gas purification system 15 and the carbon-dioxide recovery unit 13.

The syngas from which sulfur content is removed by the gas purification system 15 contains about 30% carbon monoxide. The syngas containing the carbon monoxide is introduced to the carbon-monoxide shift converter 28. The carbon-monoxide shift converter 28 causes a catalytic reaction between the carbon monoxide and water vapor using a catalyst to generate carbon dioxide and hydrogen. The carbon monoxide in the syngas introduced to the carbon-monoxide shift converter 28 is converted to a required amount of carbon dioxide.

The predetermined amount of carbon dioxide corresponds to 10% of the syngas introduced to the carbon-dioxide recovery unit 13.

The carbon dioxide converted by the carbon-monoxide shift converter 28 is introduced to the carbon-dioxide recovery unit 13 together with the syngas. The converted carbon dioxide and the carbon dioxide in the syngas that is let out from the gas purification system 15 are recovered by the carbon-dioxide recovery unit 13 in a required amount. Part of the carbon dioxide recovered by the carbon-dioxide recovery unit 13 may be increased in pressure by the carbon-dioxide recovery unit compressor 27 and then introduced to the pulverized-coal hopper 7, the char hopper 12, and the porous filter 10 (not shown). The remaining carbon dioxide is introduced to a carbon dioxide storage facility 30 provided in the ground at the integrated coal gasification combined cycle plant 1.

Carbon dioxide and fuel gas that are not recovered by the carbon-dioxide recovery unit 13 are introduced to the combustor 17 of the gas turbine 16.

As described above, the integrated coal gasification combined cycle plant according to this embodiment has the following operational advantages.

The fuel gas produced by the coal gasification furnace 9 contains carbon dioxide. Thus, the carbon-dioxide recovery unit 13 is provided between the gas purification system 15 and the combustor 17 of the gas turbine 16. This allows the carbon dioxide in the raw syngas let out from the coal gasification furnace 9 to be recovered by the carbon-dioxide recovery unit 13. Therefore, this eliminates the need to generate inert gas separately, thus reducing the facility costs of the integrated coal gasification combined cycle plant 1 and preventing a decrease in the efficiency of the integrated coal gasification combined cycle plant 1.

The carbon-monoxide shift converter 28 is provided upstream of the carbon-dioxide recovery unit 13. This allows carbon monoxide to be converted to carbon dioxide with the carbon-monoxide shift converter 28 and allows a predetermined amount of carbon dioxide to be supplied to the carbon-dioxide recovery unit 13 even if the carbon dioxide in the fuel gas let out from the coal gasification furnace 9 does not satisfy a predetermined amount. Therefore, this eliminates the need to generate inert gas separately, thus reducing the facility costs of the integrated coal gasification combined cycle plant 1 and preventing a decrease in the efficiency of the integrated coal gasification combined cycle plant 1.

Regarding the carbon dioxide recovered by the carbon-dioxide recovery unit 13, by recovering a predetermined amount or more of carbon dioxide necessary for carrying pulverized coal and char and for pressurizing the pulverized-coal hopper 7 and the char hopper 12 and by storing it outside the integrated coal gasification combined cycle plant 1, the amount of carbon dioxide released from the integrated coal gasification combined cycle plant 1 directly to the atmosphere can be reduced.

The depressurization evacuation system that depressurizes and evacuates the interior of the pulverized-coal hopper 7 and the char hopper 12 does not release the carbon dioxide to the atmosphere but is connected to the storage facility 30 provided outside the integrated coal gasification combined cycle plant 1, and the carbon dioxide is stored therein. This can therefore reduce the amount of carbon dioxide released from the integrated coal gasification combined cycle plant 1 to the atmosphere, thus preventing global warming.

Third Embodiment

A third embodiment of the present invention will be described hereinbelow. An integrated coal gasification combined cycle plant of this embodiment differs from the first embodiment in that the carbon-dioxide recovery unit is provided between the exhaust-heat recovery boiler and the chimney; the other features are the same. Accordingly, the same configurations and the flow of the recovery and supply of carbon dioxide are given the same reference signs, and descriptions thereof will be omitted.

Figure 3:
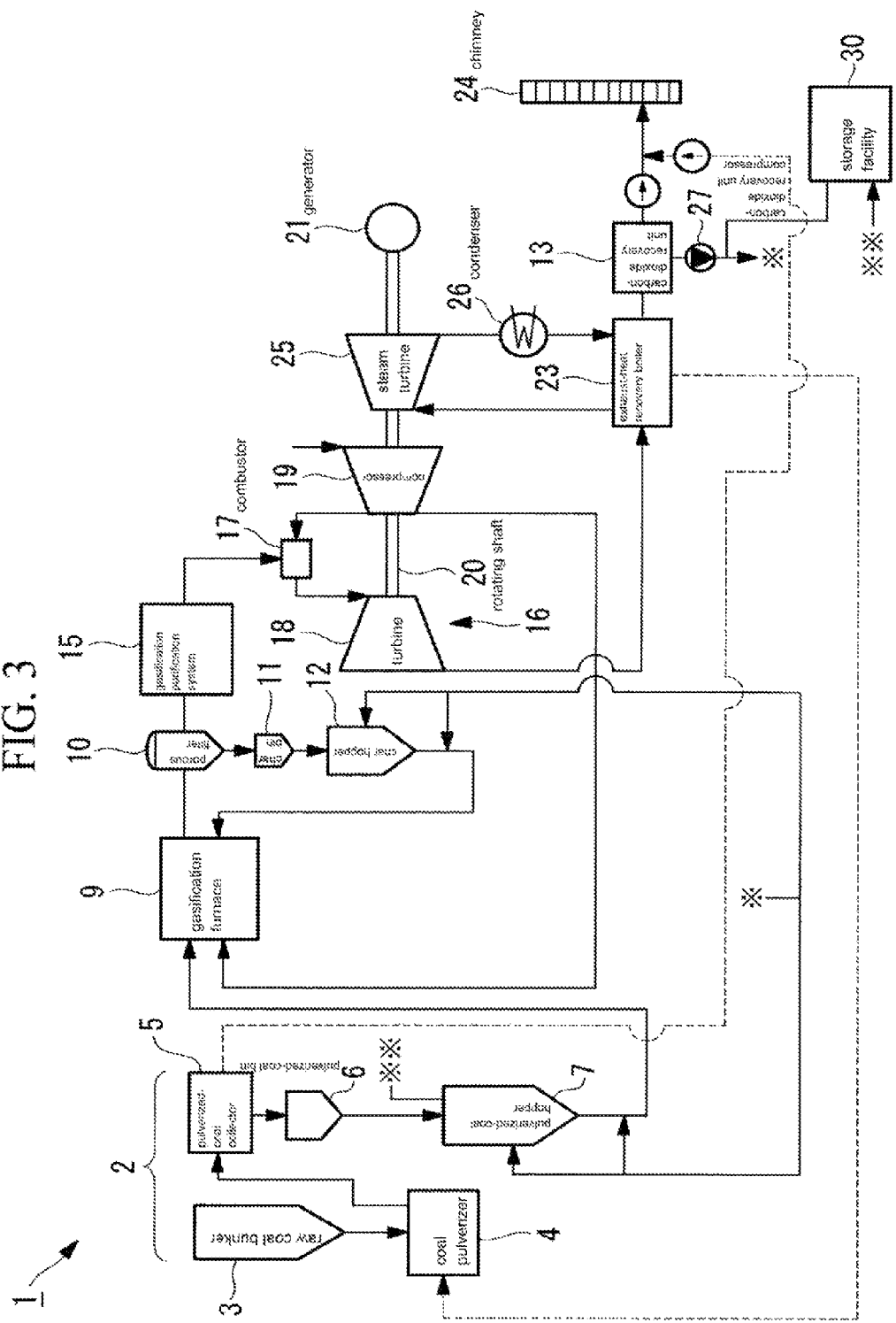
FIG. 3 is a schematic configuration diagram of an integrated coal gasification combined cycle plant according to a third embodiment of the present invention.

FIG. 3 shows a schematic configuration diagram of the integrated coal gasification combined cycle plant according to the third embodiment of the present invention.

The carbon-dioxide recovery unit 13 is provided between the exhaust-heat recovery boiler 23 and the chimney 24.

The exhaust gas that has heated feed water introduced to the exhaust-heat recovery boiler 23 contains about 10% carbon dioxide. The carbon dioxide in the exhaust gas is recovered by the carbon-dioxide recovery unit 13. The carbon dioxide recovered by the carbon-dioxide recovery unit 13 may be increased in pressure by the carbon-dioxide recovery unit compressor 27 and then introduced to the pulverized-coal hopper 7, the char hopper 12, and the porous filter 10 (not shown).

The exhaust gas containing carbon dioxide that is not recovered by the carbon-dioxide recovery unit 13 is introduced to the chimney 24.

As described above, the integrated coal gasification combined cycle plant according to this embodiment has the following operational advantages.

The carbon-dioxide recovery unit 13 is provided downstream of the exhaust-heat recovery boiler 23. This allows the carbon dioxide in the exhaust gas let out from the exhaust-heat recovery boiler 23 to be recovered by the carbon-dioxide recovery unit 13. This can therefore reduce the amount of carbon dioxide discharged from the integrated coal gasification combined cycle plant 1.

By recovering a predetermined amount or more of carbon dioxide necessary for carrying pulverized coal and char and for pressurizing the pulverized-coal hopper 7 and the char hopper 12 and by storing it outside the integrated coal gasification combined cycle plant 1, the amount of carbon dioxide released from the integrated coal gasification combined cycle plant 1 directly to the atmosphere can be reduced.

The depressurization evacuation system that depressurizes and evacuates the interior of the pulverized-coal hopper 7 and the char hopper 12 does not release the carbon dioxide to the atmosphere but is connected to the storage facility 30 provided outside the integrated coal gasification combined cycle plant 1, and the carbon dioxide is stored therein. This can therefore reduce the amount of carbon dioxide released from the integrated coal gasification combined cycle plant 1 to the atmosphere, thus preventing global warming.

REFERENCE SIGNS LIST

1 integrated coal gasification combined cycle plant
2 coal supply facility
3 raw coal bunker
4 coal pulverizer
5 pulverized-coal collector
6 pulverized-coal bin
7 pulverized-coal hopper
9 gasification furnace (coal gasification furnace)
10 porous filter
11 char bin
12 char hopper
13 carbon-dioxide recovery unit
15 gas purification system
16 gas turbine
17 combustor
18 turbine
19 compressor
20 rotating shaft
21 generator
23 exhaust-heat recovery boiler
24 chimney
25 steam turbine
26 condenser
27 carbon-dioxide recovery unit compressor
28 carbon-monoxide shift converter
30 storage facility

The invention claimed is:

1. An integrated coal gasification combined cycle plant comprising:
a gasification furnace to which pulverized coal is introduced;
a gas turbine equipped with a combustor in which syngas gasified in the gasification furnace burns;
an exhaust-heat recovery boiler that generates steam by using exhaust gas let out from the gas turbine;
a steam turbine to which the steam generated in the exhaust-heat recovery boiler is introduced;
a generator driven by the steam turbine and the gas turbine to generate electrical power;
a coal pulverizer to which part of the exhaust gas let out from the gas turbine is introduced and which dries the pulverized coal before introducing the pulverized coal to the gasification furnace;
a pulverized-coal collector that collects the pulverized coal pulverized in the coal pulverizer; and
a carbon-dioxide recovery unit which receives exhaust gas that is separated at the pulverized-coal collector and not introduced to the gasification furnace, wherein the carbon-dioxide recovery unit recovers carbon dioxide therein,
wherein the pulverized coal and char are carried to the gasification furnace by the carbon dioxide recovered in the carbon-dioxide recovery unit.

2. An integrated coal gasification combined cycle plant comprising:
a gasification furnace to which pulverized coal is introduced;
a gas turbine equipped with a combustor in which syngas gasified in the gasification furnace burns;
an exhaust-heat recovery boiler that generates steam by using exhaust gas let out from the gas turbine;
a steam turbine to which the steam generated in the exhaust-heat recovery boiler is introduced;
a generator driven by the steam turbine and the gas turbine to generate electrical power;
a coal pulverizer to which part of the exhaust gas let out from the gas turbine is introduced and which dries the pulverized coal before introducing the pulverized coal to the gasification furnace;
a pulverized-coal collector that collects the pulverized coal pulverized in the coal pulverizer;
a carbon-dioxide recovery unit downstream from the gasification furnace, wherein the carbon-dioxide recovery unit recovers carbon dioxide therein,
wherein the pulverized coal and char are carried to the gasification furnace by the carbon dioxide recovered in the carbon-dioxide recovery unit; and
wherein when a hopper that supplies the pulverized coal or char to the gasification furnace is empty, exhaust gas in the hopper is introduced to a storage facility that stores carbon dioxide.

* * * * *